Dec. 23, 1952    D. J. MONTGOMERY ET AL    2,623,184
RADIATION INTENSITY METER
Filed June 30, 1950    2 SHEETS—SHEET 1
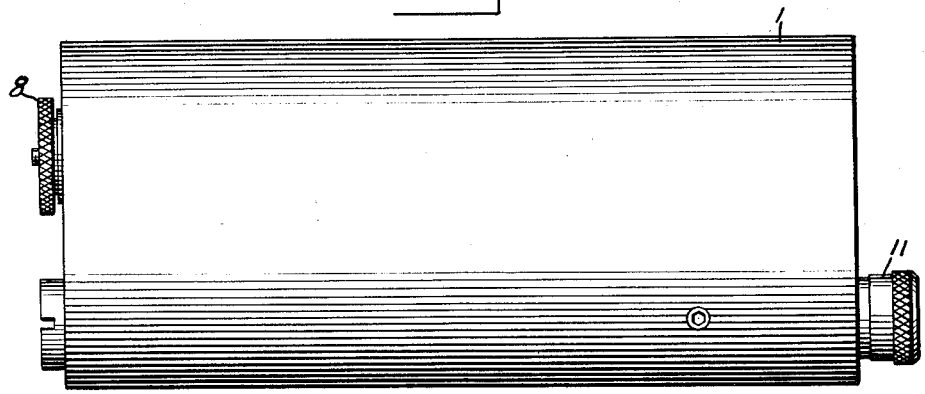
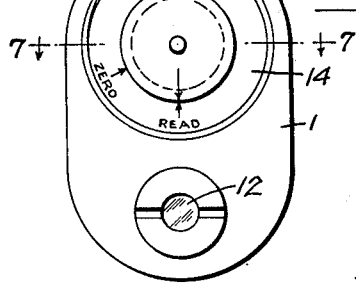
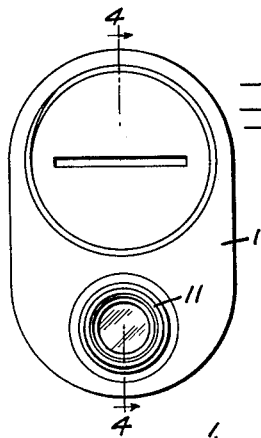
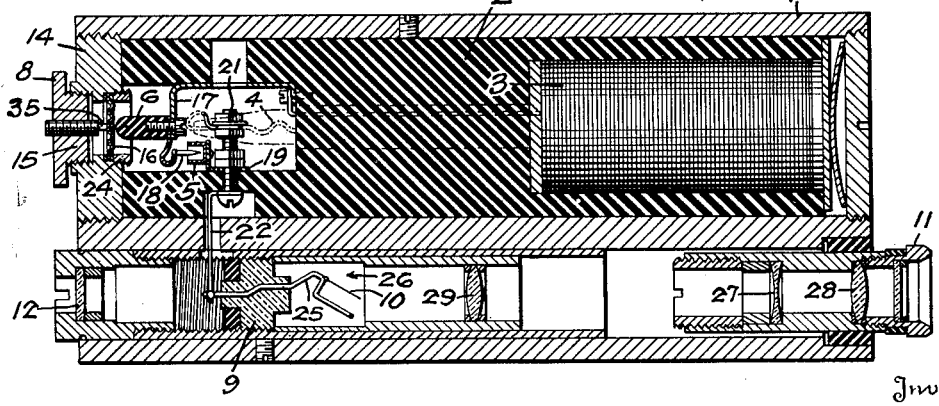
Inventors
Donald J. Montgomery
Kazuo A. Yamakawa
By J. H. Church + O. Codier — D. P. Smith
Attorneys + Agent

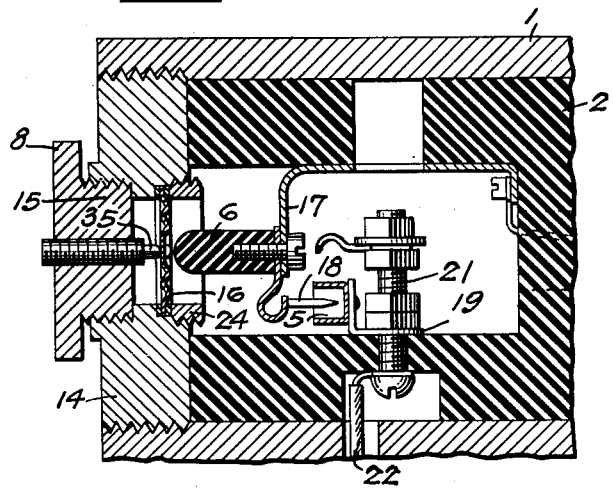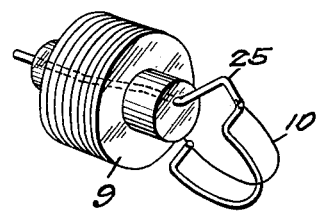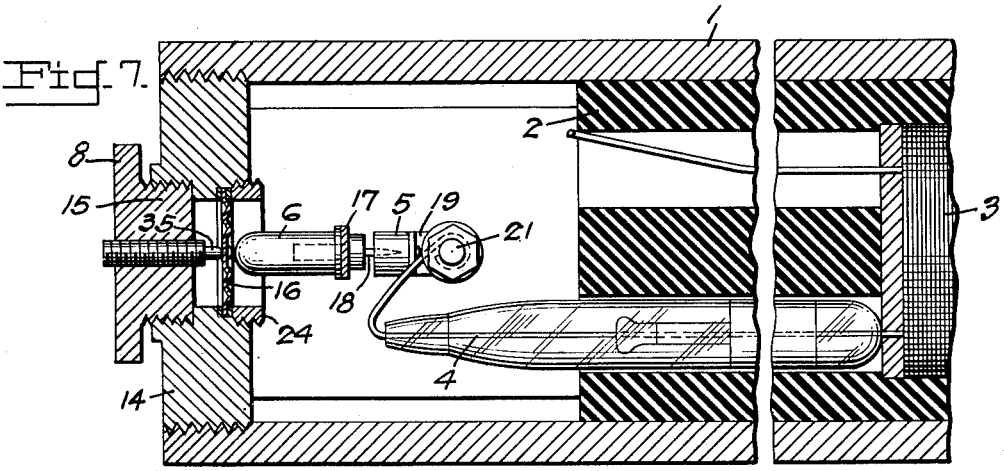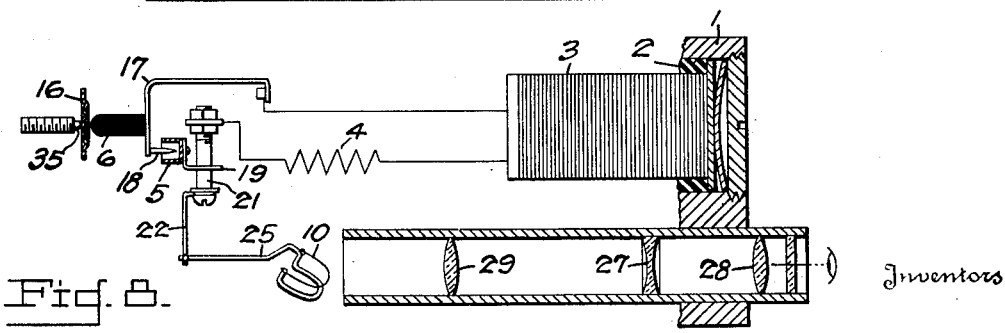

Patented Dec. 23, 1952

2,623,184

UNITED STATES PATENT OFFICE 2,623,184

RADIATION INTENSITY METER

Donald J. Montgomery, Aberdeen, and Kazuo A. Yamakawa, Bel Air, Md.

Application June 30, 1950, Serial No. 171,488

6 Claims. (Cl. 250—83.6)

(Granted under the act of March 3, 1883, as amended April 30, 1928; 370 O. G. 757)

The invention described is the specification and the claims may be manufactured and used by or for the Government for governmental purposes without the payment to us of any royalty thereon.

This invention relates generally to the radiation meter art and more specifically to a compact, portable, radiation meter suitable for individual distribution to troops or civilians who may be exposed to gamma-radiation doses dangerous to health.

Recent studies have indicated that laboratory and industrial workers continually exposed to radiation can tolerate a dose of 0.05–0.20 roentgen per day (r/d). It is believed that these values are less than dosages likely to be accepted as reasonable for troops or civilians occasionally exposed to radiation. Therefore a meter with a moderate or a low sensitivity in the range of 2 r/d to 2000 r/d is considered adequate for the latter group, particularly in view of the other hazards present and the wide range of its expected use. A high degree of accuracy is not too important under the anticipated conditions and may be considered secondary to other and more important factors. An accuracy of five per cent is more than adequate and ten, or even twenty per cent is probably acceptable.

Several important and desirable considerations immediately suggest themselves when the problem is considered. First, the ability of a meter to measure directly the rate at which radiation is received rather than the time integral of the rate or the accumulated dose. Second, for individual and continuous use the instrument must not be heavy or bulky and must fit easily in an individual's clothing or pack. Third, since exposure to radiation might occur over extended periods and since troops in the field are frequently beyond contact with any source of supply and replacement, it is well to provide an instrument that has a field and shelf life of indefinite length or at least a period of years and is not dependent upon easily dischargeable batteries. Fourth, the instrument must be rugged and should be able to withstand fairly severe treatment at least that to which, for example, binoculars might be subjected. Furthermore it should be capable of being hermetically sealed for use under extreme conditions. It should be available for use in temperatures from −40° F. to 160° F. Fifth, simplicity of operation is important so that untrained personnel will be able to operate the instrument with a minimum of instruction which is easily transmitted and remembered. Sixth, for individual distribution to personnel likely to be subject to radiation danger the cost of manufacture in production lots must not be excessive.

When the above requirements are considered it becomes apparent that the problem does not lend itself to an easy solution. In our reduction to practice, however, we found that a quartz fiber electroscope, viewed through an optical system and using a Zamboni's pile as a source of voltage results in a meter that amply meets all of the above enumerated requirements.

It is therefore a general object of our invention to provide a portable gamma ray meter.

It is a further object of our invention to provide a portable gamma ray meter that is compact, easily handled, rugged, and has an extremely long useful life.

It is a still further object of our invention to provide a gamma ray intensity meter having a quartz fiber electroscope, a Zamboni's pile and a switching means therebetween.

Fig. 1 is an elevation of the meter assembly about 1½ times its actual size.

Fig. 2 is an end view of the meter assembly shown in Fig. 1.

Fig. 3 is an end view of the meter assembly shown in Fig. 1 opposite to the view of Fig. 2.

Fig. 4 is a longitudinal section taken on lines 4—4 of Fig. 2.

Fig. 5 is an enlarged perspective view of the quartz fiber and mounting used in the electroscope of Fig. 4.

Fig. 6 is an enlarged fragmentary view of the switch assembly in accordance with our invention.

Fig. 7 is an enlarged fragmentary view of the switch taken on line 7—7 of Fig. 3.

Fig. 8 is a schematic diagram of the circuit of our invention.

In carrying out the above objects in the most practical form it is necessary to provide an ionization chamber with collecting electrodes, an electroscope to measure the potential difference between the electrodes, a resistor through which the ionization current flows, a source of electromotive force to provide the collecting field and draw off the ionization current, a switch to short circuit the resistor, an optical system to read the electroscope, and a sturdy case.

Referring to the drawings, 1 indicates a casing made of aluminum which has a low atomic number, is durable, and is relatively low in cost. The outside dimensions of the casing (4½" x 2" x 1¼") are such that it is easily held in the hand and carried in a pocket or pack. The aluminum casing forming the walls of the ionization chamber is shown generally at 26. The sensitive volume of air within the chamber is in the order of one cubic centimeter. This volume was chosen as convenient for the measuring circuit because, from the definition of the roentgen, one cubic centimeter of standard air absorbing 1 roentgen per day will yield $3.86 \times 10^{-15}$ ampere. The dosages of interest are likely to be of the order of 5 to 200 roentgens, and the dose rates are likely to be of the order of 5 r/d to 1000 r/d. For 5 r/d the current is about $2 \times 10^{-14}$ amperes. A dropping resistor of $10^{13}$ ohms will give an obserable potential change of 0.2 volt which value is conveniently measured on the instrument.

The insulator 2 fills most of the casing and has chambers therein. It is Teflon, the DuPont trade name for polymerized tetrafluoroethylene. This material has a high volume resistivity, and an extremely high surface resistivity. It is not attacked by any of the standard corrosive agents and appears to be attacked only by elementary fluorine at 150° C. and molten sodium at 200° C., and then slightly and slowly. It does not decompose at temperatures below 300° C. although there is a change into a soft transparent form at about 250° C. The water absorption is low, the power factor is low, and the dielectric strength and arc resistance are high. The brittle temperature is below —80° C. Because of its almost complete chemical inertness, Teflon may be cleaned simply with any detergent.

The source of electromotive force 3 is a dry or Zamboni's pile or simple battery of electrolytic cells. It consists of a stack of paper discs coated on one side with tin and on the other with manganese dioxide stacked under moderate pressure with dissimilar faces in contact. A single disc of a few thousandth inch thickness and a diameter of three-quarters inch generates an electromotive force of 0.5 to 0.9 volts and can deliver some thousandths of a microampere for many years. The internal resistance of a single disc may be anything from one megohm to several hundred megohms depending on its treatment and the humidity. For the application under consideration where the currents are of the order of $10^{-11}$ to $10^{-14}$ ampere the pile described has ample output. A voltage of 150 volts is deemed necessary in this application, and we have found that about 250 discs, a stack about an inch high, is sufficient to provide a voltage of this magnitude and still be compatible with the space requirements of a pocket instrument.

The glass enclosed dropping resistor 4 is used in the circuit because its constancy adds to the simplicity and permanency of calibration of the instrument. The resistor is vacuum sealed in glass which has been surface treated with silicone polymers to resist adverse moisture conditions. The sealing, coupled with care in the manufacturing process, results in a resistor that is stable, accurate, and resistant to humidity. The temperature coefficient is about —0.1 per cent per degree centigrade, and the voltage coefficient is about 0.02 per cent per volt. The element itself including the protective glass envelope is 1⅞ inches long and almost ⅕ inch in diameter. The value of resistance used in this instrument is $10^{11}$—$10^{13}$ ohms.

The switch assembly shown in detail in Figs. 6 and 7 is the solution to a difficult problem. The switch is intended to be connected in series with the quartz fiber electroscope as schematically shown in Fig. 8 and because of the small capacitance of the fiber 10 the motion, in an electric field, of a conductor to which it is attached will result in an appreciable displacement of charge with consequent change of potential and deflection. This circumference is aggravated by piezoelectric charges in the Teflon insulator, which set up strong electric fields in those regions wherein the switch arm moves. Our solution to the problem is to provide a switch with a motion limited to a few thousandths of an inch and to keep the capacitance low by minimizing the surface of the moving parts while maximizing the spacing of these parts from the walls. The bolt 21 securely holds angle member 19 against insulator 2 and serves as a terminal for wire 22 connecting to fiber 10. Cupshaped contact 5 is soldered to member 19 and needle 18 is soldered to spring member 17 and is arranged to engage the bottom surface of cup 4 when ear 6 is urged downward by pressure on diaphragm 16. The switch motion must be transmitted through a solid in order to permit hermetic sealing of the critical components of the unit. A flexible metal diaphragm 16 bonded to ring 24 has been found satisfactory. When knob 8 is rotated in a clockwise direction as shown in the drawing the threaded boss 15 and the threads on cap 14 cooperate to urge pin 35 against diaphragm 16, distorting the same whereby force is transmitted to insulating ear 6 thereby distorting spring member 17 and needle 18 engages cup member 5. When the knob is turned in a counter-clockwise direction the pin 35 removes from diaphragm 16 and the said diaphragm elastically moves to its undistorted shape permitting spring member 17 to elastically return to its undistorted position and needle 18 lifts from contact with cup 5. The knob 8 is equipped with suitable stops (not shown) which properly position the said knob in the "zero" and "read" positions.

Because the ionization currents under consideration are extremely small an electrostatic indication of voltage has been found easier to use than an electromagnetic indication of current. The electroscope with its optical system consists of a quartz-fiber arch 10 supported at both ends by a copper wire 25 bent at one end into a similar arch, said wire mounted in a transparent insulator 9 of glass or polystyrene so that light may pass from window 12 to the said quartz-fiber arch. The arch deflects by electrostatic action when a potential difference is applied between it and its surrounding conducting case. The change in deflection can be made proportional to the charge in potential over a considerable range.

The optical system is simple and consists of an eyepiece 11, focusing lenses 27, 28, 29 and window 12. The light source is external and may be any source with an average intensity of 20 foot candles for close reading. In the field, however, it has been found that a flashlight, a lighted match, or even a glowing cigarette will permit the instrument to be read.

The deflection of the fiber is read on a scale which has been photographed on the emulsion on a clear glass plate in eyepiece 11. A linear scale is suitable for this application.

The electroscope including the optical system will operate satisfactorily in temperatures ranging from —40° C. to 57° C. and has been found to withstand three falls, one on each end and one on the side through 4 feet to a concrete surface without damage to its physical or electrical characteristics.

Operation of the meter

With the shorting switch knob 8 in the "zero" position of Fig. 3 the contacts 5 and 18 are closed. The voltage of the dry pile 3 is impressed between the fiber 10 and the chamber walls, or casing 1. In the absence of gamma radiation no current flows and when the knob 8 is turned to the "read" position contacts 5 and 18 are opened but the image of fiber 10 viewed through eyepiece 11 does not deflect, because in the absence of a current flow the change in the circuit makes no difference. Gamma radiation falling on the ionization chamber disassociates some of the air therein into positive ions and electrons, the former being drawn to the walls the latter being collected by fiber 10. When switch knob is now turned from the "zero" to the "read" position, contacts 5 and 18 are opened and the ionization current now passing through resistor 4 results in a voltage drop therein. The potential difference between fiber 10 and the chamber walls falls from the open circuit voltage E to E−iR. The fiber deflects accordingly and the displacement of its image cast upon the transparent scale and viewed by the user gives an indication of the intensity of radiation falling on the chamber.

It is apparent from the foregoing disclosure that we have provided a gamma-ray intensity meter that is rugged, is of small size and weight, has a long life expectancy, is extremely simple to operate and is economical to manufacture in large quantities for mass distribution.

It will of course be understood that various changes in details of construction and arrangement of parts may be made by those skilled in the art without departing from the spirit of the invention as set forth in the appended claims.

We claim:

1. A radiation intensity meter comprising a casing of a metal of low atomic number, an electroscope having an ionization chamber, said casing forming the walls of said ionization chamber, a dry pile so connected and arranged that one pole is connected to the said casing, a resistor connected to the other pole of the said dry pile, said resistor connected to a quartz fiber mounted within said electroscope, a switch connected across the said resistor, said switch comprising a cup shaped member, a needle member cooperating therewith, resilient means urging the said needle away from the said cup, and externally operable means in operative relation with said resilient means whereby motion of said external means is transmitted to said resilient means and the needle member is urged into contact with said cup shaped member and said resistor is short circuited.

2. A radiation intensity meter comprising an alumium casing, an electroscope having an ionization chamber and a quartz fiber, said casing forming the walls of said chamber, a dry pile formed of a plurality of stacked discs, said discs having dissimilar conducting media on opposite sides thereof, one pole of said pile connected to the first end of a glass enclosed resistor, the said quartz fiber connected to the second end of said resistor, a switch arranged in parallel relation with the said resistor, said switch having a cup shaped first contact and a needle shaped second contact joined at one end to a generally U-shaped resilient member, turnable means external to said casing arranged in operative relation with said resilient member whereby said needle shaped contact is urged toward said cup shaped contact.

3. In a portable radiation intensity meter having a casing of a metal of a low atomic number, an electroscope having a quartz fiber therein, a chemically inert insulator having chambers, a source of electromotive force comprising a dry pile in one of said chambers said dry pile formed of a plurality of stacked discs having dissimilar conducting media on opposite sides thereof, one pole of said pile connected to said casing, a glass enclosed resistor and a switch within a second of said chambers said resistor and said switch electrically connected in parallel, the other pole of said pile connected to the first end of the said resistor and switch, the second end of the said resistor and switch connected to the said quartz fiber, said switch having a cup shaped first contact and a needle shaped second contact and actuating means external to the said casing to urge the said contacts apart whereby the voltage drop in the said resistor is changed and an observable fiber deflection is obtained.

4. In a portable radiation meter having a casing of a metal of a low atomic number, an electroscope comprising an optical system and a conducting supporting wire having a portion thereof bent to form a plane, a quartz fiber having a portion thereof of a shape substantially the same as that of said portion of the said supporting wire and defining a second plane parallel to and spaced from the plane of the said wire, a chemically inert insulator having chambers, a source of electromotive force comprising a dry pile in one of said chambers said dry pile formed of a plurality of stacked discs having dissimilar conducting media on opposite sides thereof, one pole of said pile connected to said casing, a resistor and a normally open switch connected in parallel relationship, the other pole of the said pile connected to the first common end of the resistor and switch, the second common end of the said resistor and switch connected to the said supporting wire, and means disposed externally of the said casing to close the said switch to short circuit the said resistor.

5. The invention as set forth in claim 4 wherein the said optical system comprises at least an eyepiece and a window for the admission of external light.

6. The invention as set forth in claim 5 wherein the said dissimilar conducting media are tin and manganese dioxide respectively.

DONALD J. MONTGOMERY.
KAZUO A. YAMAKAWA.

REFERENCES CITED

The following references are of record in the file of this patent:

UNITED STATES PATENTS

| Number | Name | Date |
|---|---|---|
| 590,838 | Hoffman | Sept. 28, 1897 |
| 1,855,669 | Glasser et al. | Apr. 26, 1932 |
| 2,465,886 | Landsverk et al. | Mar. 29, 1949 |
| 2,472,625 | Smith | June 7, 1949 |

OTHER REFERENCES

"Shielded Contact" Grounding Key for Electrometers by G. Failla, Nov. 10, 1947, MDDC 1420, 2 pages.

Summary Report on the Development of Electrometer Radiation Instruments, by Landsverk et al., April 13, 1948, A. E. C. D. 1865, page 20.

Gamma Ray Pocket Survey Meter, Landsverk, August 22, 1945, pages 1–10 MDDC–952.